Figure 1:
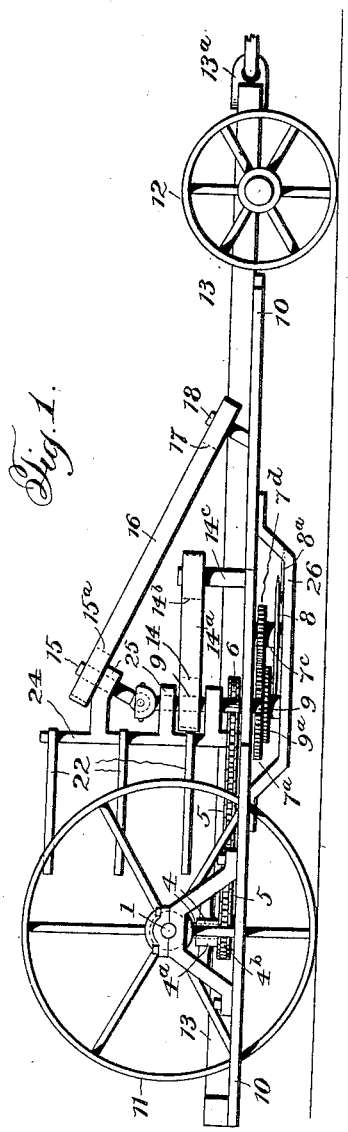

No. 821,985. PATENTED MAY 29, 1906.
R. A. CLARK.
STALK CUTTER.
APPLICATION FILED APR. 16, 1904.

2 SHEETS—SHEET 1.

Witnesses:
Jas. E. Hutchinson
Thos. R. Heath

Inventor:
Ralph A. Clark.
By Jos. H. Hunter, Attorney

No. 821,985. PATENTED MAY 29, 1906.
R. A. CLARK.
STALK CUTTER.
APPLICATION FILED APR. 16, 1904.
2 SHEETS—SHEET 2.
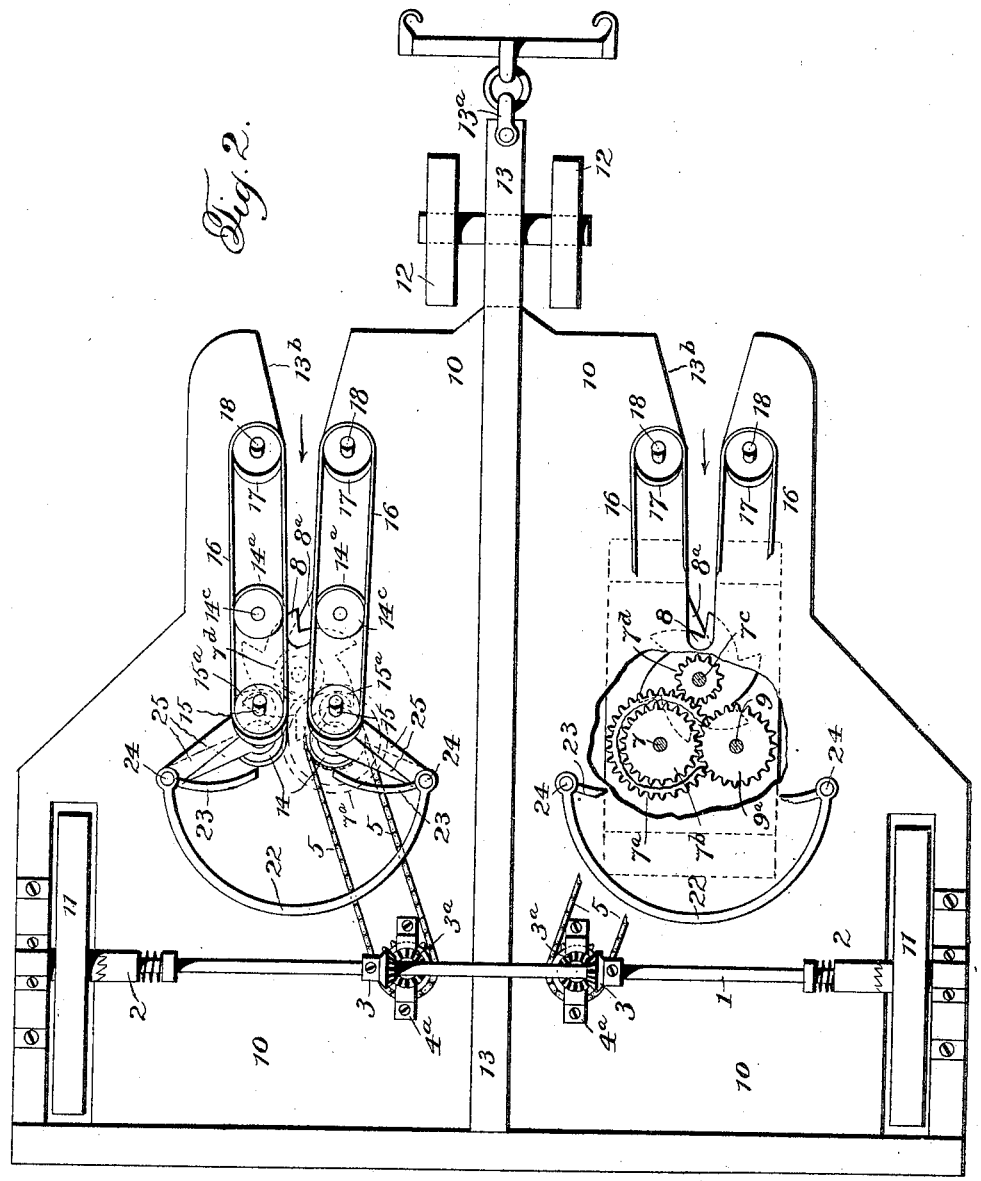
Witnesses:
Jas. E. Hutchinson
Thos. R. Heath
Inventor:
Ralph A. Clark,
By Jos. H. Hunter, Attorney

UNITED STATES PATENT OFFICE.

RALPH A. CLARK, OF CHELSEA, INDIAN TERRITORY.

STALK-CUTTER.

No. 821,985.  Specification of Letters Patent.  Patented May 29, 1906.

Application filed April 16, 1904. Serial No. 203,469.

*To all whom it may concern:*

Be it known that I, RALPH A. CLARK, a citizen of the United States, residing at Chelsea, Cherokee Nation, Indian Territory, have invented new and useful Improvements in Stalk-Cutters, of which the following is a specification.

This invention relates to an improvement in stalk-cutters, and more particularly to a machine for cutting the standing stalks and holding the cut stalks so that they can be conveniently tied in shocks.

The object of the invention is the provision of a simple and efficient device of this character the cutting apparatus of which is arranged to cut two rows of stalks at the same time.

A further object of the invention is the provision of means for guiding the stalks to the cutting apparatus and for conveying the cut stalks to the stalk-securing frame.

Other objects of the invention will be apparent from the detail description hereinafter when read in connection with the drawings forming a part hereof, wherein a preferable embodiment of my invention is shown and wherein like numerals of reference refer to similar parts in the both views.

Figure 1 is a side elevation of my improved stalk-cutter, and Fig. 2 is a top plan view thereof with portions broken away.

Referring now more particularly to the drawings, 10 designates a platform which is mounted on wheels 11, which are loosely mounted on the axle 1, which is journaled in suitable bearings at the rear corners of the frame. Clutches 2 are provided, so that the wheels may be disconnected from the axle, which constitutes the drive-shaft of the machine. The forward portion of the platform 10 is supported by the wheels 12, which are secured to the longitudinally-extending beam 13, which is secured to the central portion of the platform. To the forward portion of the beam 13 is secured a draft-link 13ª, of any suitable construction, which carries the whiffletree. The platform 10 is provided on opposite sides of the beam 13 with the openings 13ᵇ, extending rearwardly from the front thereof, which permit the passage of the rows of stalks to the cutting apparatus, the machine being designed to be driven between two rows of stalks and to operate on both rows at the same time.

As the stalk-receiving frames, the cutting apparatus, the stalk-guiding means, and the driving means therefor are arranged in duplicate on each side of the machine, only that on one side of the machine will be described in detail.

Secured to the upper side of the platform on opposite sides of and in rear of the opening 13ᵇ therein are a pair of uprights 24, which constitute the supports for the stalk-receiving frame, said frame being formed by the curved bars 22, connecting said uprights, and the bars 23, extending inwardly therefrom, a space being left between the free ends of the bars 23 to permit the passage of the stalks into the stalk-receiving frame. The uprights which form the supports for the stalk-receiving frame are also provided with the integrally-formed forwardly-extending arms 25, which are apertured at their free ends to form bearings for the shafts 7 and 9, which serve as drive-shafts for the upper and lower pairs of feeding-belts 14ª and 16. The shafts 7 and 9 are made in two sections, a lower vertical section and an upper section 15, extending forwardly at an angle from the lower vertical section and connected thereto by a universal joint. The lower ends of the shafts 7 and 9 are spaced in suitable bearings carried by the bracket 26, secured to the under side of the platform 10. The shafts 7 and 9 are intergeared by means of the gears 7ᵇ and 9ª, keyed thereto below the platform. The shaft 7 also has secured thereto a gear 7ª, which meshes with a gear 7ᵈ, which is keyed to the shaft 7ᶜ, which is journaled in suitable bearings in the bracket 26 below the platform and carries the rotary knife 8, which coöperates with an inclined stationary knife 8ª, also secured to the bracket 26. The vertical portions of the shafts 7 and 9 have keyed thereto above the platform the pulleys 14, which constitute the driving-pulleys for the lower pair of feeding-belts 14ª, the forward ends of said belts being supported on idle pulleys 14ᵇ, journaled on shafts 14ᶜ, which are secured to the platform in advance of the cutter. Secured to the upper ends of the angularly-disposed portions 15 of the shafts 7 and 9 are the pulleys 15ª, which serve as drive-pulleys for the upper pair of feeding-belts 16, the forward ends of said belts being supported by the idle pulleys 17, journaled on the inclined shafts 18, which are secured on the platform in advance of the shafts 14ᶜ. The shafts 14ᶜ and 18 are spaced apart wider than the shafts 7 and 9, so that both the upper and lower paths of feeding-belts converge from their front to their rear ends. The shaft 7, and consequently the shaft 9 and the rotary cutter 8, which are both geared therewith, are driven by a sprocket-chain 5, which passes over a sprocket-wheel 6, which is keyed to said shaft 7, and a sprocket-wheel $4^b$, keyed to a vertical shaft 4, supported in a bearing $4^a$, secured to the upper side of the platform directly below the drive-shaft. The vertical shaft 4 has keyed thereto a bevel-gear $3^a$, which meshes with a bevel-gear 3, keyed to the drive-shaft 1.

In operation the clutches 2 are actuated to cause the rotation of the drive-shaft 1, which will actuate the feeding-belts and cutters. The machine is then driven between two rows of stalks, and the stalks will enter the openings $13^b$ in the platform and be engaged by the feeding-belts and carried beyond the cutter and into the stalk-receiving frame. As the forward ends of all of the belts extend in advance of the cutter, it will be seen that the stalks are positively gripped at both their lower ends and fed past the cutter and into the stalk-receiving frame.

What I desire to secure by Letters Patent is—

A stalk-cutting apparatus comprising a wheeled platform having an opening therein extending rearwardly from the front thereof, a pair of uprights secured to said platform on opposite sides of and in rear of the opening therein, a stalk-receiving frame supported by said uprights, laterally-extending arms projecting from said uprights, a pair of intergeared upwardly-extending shafts journaled in said arms and positioned on opposite sides of and in rear of the opening in said platform, gearing between one of said shafts and the drive-wheels, a rotary cutter geared to one of said shafts and extending transversely across the opening in the platform, two pairs of upwardly-extending shafts secured to the forward portion of the platform on opposite sides of the opening therein and positioned adjacent the forward edge of the cutter, and belts connecting the upper and lower ends of the shafts in rear of the platform-opening with the shafts secured to the forward portion of the platform, the upper belts inclining upwardly toward the stalk-receiving frame.

In testimony whereof I have signed my name to this specification in the presence of two subscribing witnesses.

RALPH A. CLARK.

Witnesses:
F. M. BRISCOT,
J. H. WILLIAMS.